United States Patent
Kraberger et al.

(10) Patent No.: US 12,170,357 B2
(45) Date of Patent: Dec. 17, 2024

(54) BATTERY SYSTEM AND VEHICLE INCLUDING THE BATTERY SYSTEM

(71) Applicant: SAMSUNG SDI CO., LTD., Yongin-si (KR)

(72) Inventors: Gernot Kraberger, Graz (AT); Wolfgang Reinprecht, Attendorf (AT); Michael Erhart, Seiersberg-Pirka (AT)

(73) Assignee: SAMSUNG SDI CO., LTD, Yongin-si (KR)

( * ) Notice: Subject to any disclaimer, the term of this patent is extended or adjusted under 35 U.S.C. 154(b) by 487 days.

(21) Appl. No.: 17/673,367

(22) Filed: Feb. 16, 2022

(65) Prior Publication Data

US 2022/0263154 A1     Aug. 18, 2022

(30) Foreign Application Priority Data

Feb. 17, 2021   (EP) ..................................... 21157611
Feb. 14, 2022   (KR) ........................ 10-2022-0019078

(51) Int. Cl.
*H01M 10/6554* (2014.01)
*H01M 10/613* (2014.01)
(Continued)

(52) U.S. Cl.
CPC ..... *H01M 10/6554* (2015.04); *H01M 10/613* (2015.04); *H01M 10/625* (2015.04);
(Continued)

(58) Field of Classification Search
CPC ............. H01M 50/367; H01M 10/613; H01M 10/6556; H01M 50/35
See application file for complete search history.

(56) References Cited

U.S. PATENT DOCUMENTS

| | | |
|---|---|---|
| 2011/0027632 A1 | 2/2011 | Higashino et al. |
| 2013/0078496 A1 | 3/2013 | Lim et al. |

(Continued)

FOREIGN PATENT DOCUMENTS

| | | |
|---|---|---|
| CN | 111969158 A | 11/2020 |
| DE | 10 2017 212 223 A1 | 1/2019 |

(Continued)

OTHER PUBLICATIONS

Machine translation of CN 111969158 A from Espacenet (Year: 2020).*

(Continued)

*Primary Examiner* — James M Erwin
*Assistant Examiner* — Zackary Richard Cochenour
(74) *Attorney, Agent, or Firm* — LEWIS ROCA ROTHGERBER CHRISTIE LLP

(57) ABSTRACT

A battery system includes: a plurality of battery cells, each of the battery cells having a venting side including a venting exit configured to allow venting products to exit the battery cells during a thermal runaway and a cooling side opposite the venting side; a cooling plate, the cooling side of the battery cells being in thermal connection with a first side of the cooling plate; and a battery housing enclosing the battery cells in a cell chamber. A guiding channel is formed between a second side of the cooling plate opposite the first side and a channel wall of the battery housing facing the second side of the cooling plate, and a passage fluidly connects the cell chamber and the guiding channel. Thus, when the venting products are emitted by the battery cells from the venting side into the cell chamber, the venting products are directed along a venting path from the cell chamber through the passage into the guiding channel and through the guiding channel to an environment of the battery system via a system exit.

9 Claims, 1 Drawing Sheet

(51) Int. Cl.
  *H01M 10/625* (2014.01)
  *H01M 10/6556* (2014.01)
  *H01M 50/367* (2021.01)
(52) U.S. Cl.
  CPC ..... *H01M 10/6556* (2015.04); *H01M 50/367* (2021.01); *H01M 2220/20* (2013.01)

(56) References Cited

U.S. PATENT DOCUMENTS

| | | | | |
|---|---|---|---|---|
| 2018/0351219 | A1* | 12/2018 | Smith | H01M 50/30 |
| 2019/0140235 | A1 | 5/2019 | Lindstrom et al. | |
| 2020/0220130 | A1* | 7/2020 | Kume | H01M 50/35 |

FOREIGN PATENT DOCUMENTS

| | | | |
|---|---|---|---|
| JP | 2018-045963 A | | 3/2018 |
| KR | 10-2013-0032959 A | | 4/2013 |
| KR | 10-2019-0022485 A | | 3/2019 |
| WO | WO 2009/128214 A1 | | 10/2009 |

OTHER PUBLICATIONS

Korean Office Action for KR Application No. 10-2022-0019078, dated May 31, 2024, 7 pages.

Extended European Search Report issued in corresponding application No. EP 21157611.1, dated Aug. 10, 2021, 5 pages.

Golubkov, A.W. et al., "Thermal Runaway of Large Automotive Li-Ion Batteries," The Royal Society of Chemistry, RSC Advances 8, 2018, p. 40172-40186.

Golubkov, A.W. "Thermal Runaway of Commercial 18650 Li-ion Batteries with LFP and NCA Cathodes—Impact of State of Charge and Overcharge," The Royal Society of Chemistry, RSC Advances 5, 2015, pp. 57171-57186.

Golubkov, A.W., et al., "Thermal-Runaway Experiments on Consumer Li-ion Batteries with Metal-Oxide and Olivin-Type Cathodes," The Royal Society of Chemistry, RSC Adv., 4, 2014, pp. 3633-3642.

* cited by examiner

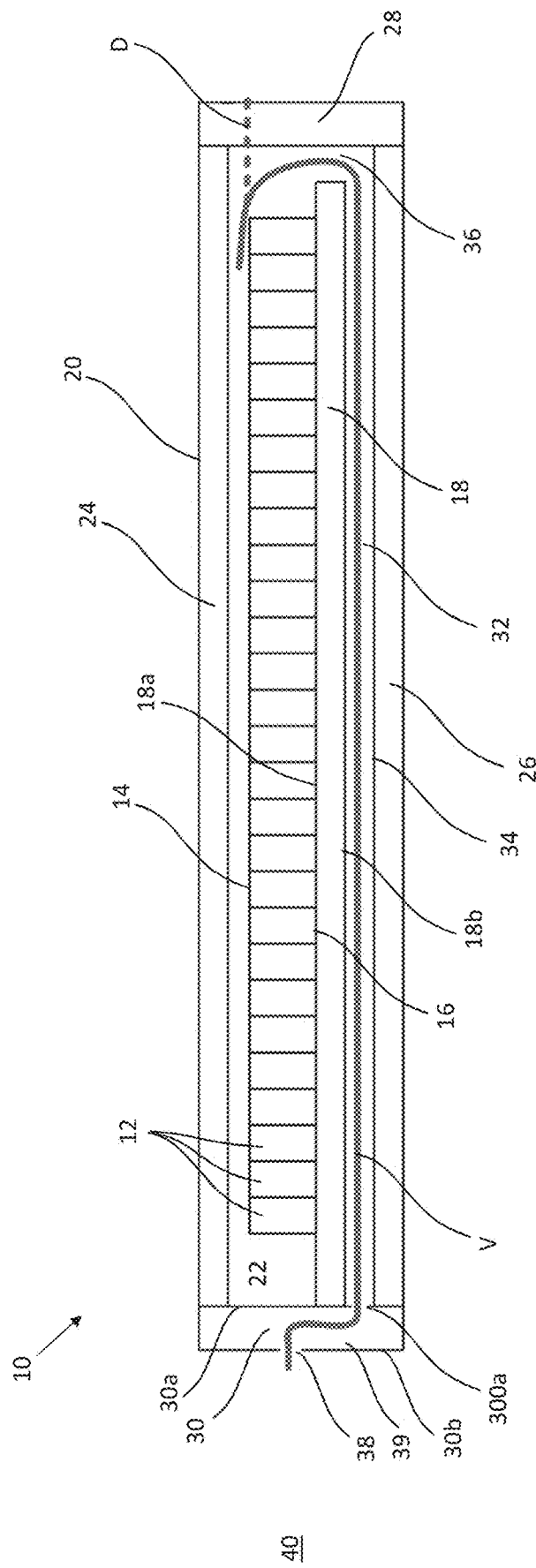

BATTERY SYSTEM AND VEHICLE INCLUDING THE BATTERY SYSTEM

CROSS-REFERENCE TO RELATED APPLICATION

This application claims priority to and the benefit of European Patent Application No. 21157611.1, filed in the European Patent Office on Feb. 17, 2021, and Korean Patent Application No. 10-2022-0019078, filed in the Korean Intellectual Property Office on Feb. 14, 2022, the entire content of both of which are incorporated herein by reference.

BACKGROUND

1. Field

Aspects of embodiments of the present disclosure relate to a battery system allowing for vented gas exhausted in case of a thermal runaway to cool down before leaving (or exiting) the battery system. Further, other aspects of embodiments of the present disclosure relate to a vehicle including the battery system.

2. Description of the Related Art

In recent years, vehicles for transportation of goods and people have been developed that use electric power as a source for motion. Such an electric vehicle is an automobile that is propelled by an electric motor, using energy stored in rechargeable batteries. An electric vehicle may be solely powered by batteries or may be a hybrid vehicle powered in part by, for example, a gasoline generator. Furthermore, the vehicle may include a combination of electric motor and conventional combustion engine. In general, an electric-vehicle battery (EVB), or traction battery, is a battery used to power the propulsion of battery electric vehicles (BEVs). Electric-vehicle batteries differ from starting, lighting, and ignition batteries because they are designed to give power over sustained periods of time. A rechargeable (or secondary) battery differs from a primary battery in that it is designed to be repeatedly charged and discharged, while the latter is designed to provide only an irreversible conversion of chemical to electrical energy. Low-capacity rechargeable batteries may be used as a power supply for small electronic devices, such as cellular phones, notebook computers, and camcorders, while high-capacity rechargeable batteries may be used as the power supply for electric and hybrid vehicles and the like.

Generally, rechargeable batteries include an electrode assembly including a positive electrode, a negative electrode, and a separator interposed between the positive and negative electrodes, a case for receiving (or accommodating) the electrode assembly, and an electrode terminal electrically connected to the electrode assembly. An electrolyte solution is injected into the case to enable charging and discharging of the battery via an electrochemical reaction of the positive electrode, the negative electrode, and the electrolyte solution. The shape of the case, such as cylindrical or rectangular, depends on the battery's intended purpose. Lithium-ion (and similar lithium polymer) batteries, widely known via their use in laptops and consumer electronics, dominate the most recent electric vehicles in development.

Rechargeable batteries may be used as a battery module including of a plurality of unit battery cells coupled to each other in series and/or in parallel to provide a high energy content, in particular for motor driving of a hybrid vehicle. For example, the battery module is formed by interconnecting the electrode terminals of the plurality of unit battery cells in an arrangement based on a required amount of power and to realize a high-power rechargeable battery.

Battery modules can be constructed either in block design or in modular design. In block designs, each battery is coupled to a common current collector structure and a common battery management system, and the unit thereof is arranged in a housing. In modular designs, pluralities of battery cells are connected to form submodules, and several submodules are connected to form the battery module. In automotive applications, battery systems often consist of a plurality of battery modules connected to each other in series to provide a desired voltage. Therein, the battery modules may include submodules with a plurality of stacked battery cells, each stack including cells connected to each other in parallel that are connected in series (XpYs) or multiple cells connected to each other in series that are connected in parallel (XsYp).

A battery pack is a set of any number of battery modules. Generally, the battery modules in a battery pack are identical. The battery modules may be configured in series, parallel, or a mixture of both to deliver the desired voltage, capacity, or power density. Components of battery packs include the individual battery modules and the interconnects, which provide electrical conductivity between the battery modules.

Conventional battery systems, despite any modular structure, usually include a battery housing that acts as an enclosure to seal the battery system against the environment and provides structural protection of the battery system's components. Housed battery systems are usually mounted as a whole into their application environment, such as an electric vehicle.

To provide thermal control of the enclosed battery cells within the battery housing, a thermal management system may be used to efficiently emit, discharge, and/or dissipate heat generated within the battery housing. In certain conditions of the battery cells, an increase of the internal temperature can lead to abnormal reactions occurring in the battery cells. An example of such abnormal operation conditions is a thermal runaway in a battery cell that may be entered by a severely overheated or overcharged cell. The thermal runaway is a self-accelerating chemical reaction inside the battery cell, which produces high amounts of heat and venting gas, until nearly all available material is exhausted. The exhausted material, that is, the venting products, may include hot and toxic venting gas as well as potentially conductive solid material, like graphite powder and metal fragments.

The temperature of the venting products, in particular the venting gas, can reach temperatures of about 1000° C. or even higher, especially when several battery cells go into thermal runaway at the same time or within a short time span. The temperature of the venting products is usually still very high when the venting products leave (or exit or are emitted from) the battery system through the system venting element to the environment. This presents a danger for bystanders as the hot venting products may cause burns and may ignite, causing a fire.

Modern venting concepts usually let the hot venting products of a battery cell in a thermal runaway condition expand into the battery housing and exit the battery system through a system venting element to the environment of the battery housing. As the venting products escape, the battery system the pressure inside the battery system can be kept in a safe range. The system venting element can be, for example, dimensioned according to ISO4126-6.

SUMMARY

Aspects of embodiments of the present disclosure overcome or reduce at least some of the drawbacks of the prior art and provide a battery system that reduces or minimizes the danger of burns and fire in a simple and cost efficient manner.

According to an embodiment, a battery system for a vehicle includes a plurality of battery cells and a battery housing enclosing the plurality of battery cells in a cell chamber. The battery cells have a venting side including one or more venting exits through which venting products exit the battery cells during a thermal runaway and a cooling side opposite the venting side in thermal connection with a first side of a cooling plate. The battery system includes a guiding channel formed between a second side of the cooling plate opposite the first side and a channel wall facing the second side of the cooling plate and a passage connecting (e.g., fluidly connecting) the cell chamber and the guiding channel. The battery system is configured such that, in the event of a thermal runaway, the venting products leaving (or emitted by) the battery cells at the venting side into the cell chamber are directed along a venting path from the cell chamber through the passage into the guiding channel and through the guiding channel to an environment of the battery system via a system exit.

The battery housing encloses (or accommodates) the battery cells. The battery cells may be arranged in (or to form) modules as explained above. The battery cells have a venting side at one end, which, in an installation setting (or orientation) of the battery system in an electric vehicle, may be considered the upper side of the battery cells. The battery cells have a cooling side at an opposite end thereof, which, in the installation setting, may be the lower (or bottom) side of the battery cells. The cooling side of the battery cells is in thermal contact with a cooling plate to transfer excess thermal energy to the cooling plate. The cooling side of the battery cells may be in direct or indirect contact with the first side of the cooling plate.

The guiding channel is arranged on (or formed by) the second side of the cooling plate opposite to the first side. For example, the cell chamber where the battery cells are arranged is on one side of the cooling plate and the guiding channel is arranged on the other side of the cooling plate. The cooling plate delimits (or defines) the cell chamber from the guiding channel. According to embodiments of the present disclosure, a passage is provided (or formed) connecting (e.g., fluidly connecting) the cell chamber and the guiding channel so that venting products may pass from the cell chamber into the guiding channel. The guiding channel may extend from the passage to the system exit. Thus, the passage may be considered the inlet of the guiding channel and the system exit the outlet of the guiding channel. The system exit may be an opening towards (or open to) the exterior of the battery system and may include a venting valve.

In the battery system according to embodiments of the present disclosure, the venting products of a thermal runaway leave (or are emitted from) the battery cells at the venting side into the cell chamber, flow along a venting path from the cell chamber through the passage into the guiding channel and through at least a part of the guiding channel to an environment of the battery system via a system exit. The battery system is designed so that the venting products exiting the battery cells during a thermal runaway do not leave the battery system via a shortest route but rather after a detour. Compared to conventional battery systems, the venting path the venting products take from the battery cells to the environment of the battery system is longer so that the venting products may pass more thermal energy to the inside parts of the battery system. For example, a relatively large amount of thermal energy is transferred from the venting products to the cooling plate and the channel wall which delimit the guiding channel.

The venting path is increased over conventional battery systems at least in part because the venting products exit the battery cells not through the cooling plate, but rather into the cell chamber (e.g., towards a top cover of the battery housing) and via the passage into the guiding channel. For example, the venting products are exhausted by the battery cells in a direction away from the cooling plate and not directly through the cooling plate. Thus, the venting path is increased over conventional battery systems. Also, the battery system according to embodiments of the present disclosure require no additional elements for cooling, for example, no cooling gas or fluid has to be injected.

This venting geometry leads to a sufficient cool-down of the venting products before exiting the battery system towards the environment so that the danger of burns and fires is reduced or minimized. In particular, the venting products exiting the battery system towards (or into) the environment are at lower temperature than with conventional battery systems.

The battery housing may enclose the cooling plate and/or the guiding channel as well. The battery housing may include a top cover facing the venting side of the battery cells and a bottom cover opposite the top cover. The cell chamber may be delimited by the top cover and the first side of the cooling plate. The channel wall delimiting the guiding channel may be formed by (or may be) the bottom cover of the battery housing. For example, in the installation setting, the bottom cover may be part of an underbody of the battery housing. Thus, in one embodiment, the battery system is configured such that, in case of a thermal runaway, the venting products exit the battery cells at the venting side towards the top cover of the housing which faces the venting side, the venting products thus flow into the cell chamber. Further, the venting products according to one embodiment are directed along the venting path from the cell chamber through the passage into the guiding channel (thereby leaving the cell chamber), the guiding channel being arranged below the cooling plate on the opposite side of the battery cells, and through at least a part of the guiding channel along the cooling plate and the bottom cover/underbody to an environment of the battery system. In other words, the venting products (e.g., the vented gas and any particles it may include) are vented, in the case of a thermal runaway, through the underbody of the battery housing to cool the venting products and allow for safe venting to an environment of the battery system.

According to an embodiment, the passage is arranged at one end of the cooling plate and the system exit is arranged at an opposite end of the cooling plate so that the guiding channel extends from the one end of the cooling plate to the opposite end of the cooling plate. As a consequence, the guiding channel stretching from the passage to the system exit extends along the entire length of the cooling plate (e.g., along the entire second side of cooling plate). The venting path is therefore relatively long so that a larger amount of thermal energy of the venting products may be transferred to the cooling plate and the channel wall, which form the guiding channel. This results in the venting products being cooled down further before exiting the battery system and, therefore, further increases safety. The passage may lead (or extend) from the cell chamber to the guiding channel past one end of the cooling plate. The passage may be arranged between an end of the cooling plate and a sidewall member of the battery housing facing said end of the cooling plate. In another embodiment, however, the passage may be formed as an opening (or through-hole) in the cooling plate. In some embodiments, the passage is the only connection between the cell chamber and the guiding channel allowing venting products to pass from the cell chamber into the guiding channel to ensure that the venting products can take only the prescribed (or predetermined) venting path via the passage through the guiding channel.

According to an embodiment, the system exit is arranged in a sidewall member of the battery housing. The sidewall member may connect (or may extend between) the bottom cover and the top cover of the battery housing and may delimit the cell chamber and/or the guiding channel at the sides. An exit channel may be arranged inside the sidewall member, and the sidewall member may have an aperture connecting the guiding channel with the exit channel. For example, the battery housing may include a first sidewall member and a second sidewall member opposite the first sidewall member. In some embodiments, the battery housing may include a first sidewall member connecting the bottom cover and the top cover of the battery housing at one end and a second sidewall member connecting the bottom cover and the top cover of the battery housing at an opposite end. The top cover, bottom cover, and first and second sidewall members may enclose the cell chamber and/or the guiding channel. The system exit may be arranged in one of the first and second sidewall members. For example, the system exit may be arranged in the one of the first and second sidewall members which leads to the venting path being the longest. For example, the passage may be arranged at (or adjacent or near) the first sidewall member and the system exit may be arranged in the second sidewall member. Such an arrangement leads to a relatively long guiding channel and, therefore, a long venting path and better cooling of the venting products.

According to another embodiment, the system exit is arranged in the channel wall. Thus, different from an embodiment in which the system exit is arranged in a sidewall member, the system exit may be arranged directly in the channel wall. In such an embodiment, the channel wall may be formed by the bottom cover or underbody of the battery housing. The venting products then exit the battery system downwardly with respect to an installation position in a direction to an underground on which the vehicle stands or drives. The venting process is then relatively safe for bystanders because even if the temperature of the venting products exiting the system exit to the environment of the vehicle are still relatively high, it is unlikely that any bystanders will come in contact with them. Although arranged in the channel wall, the system exit is at a distance as large as possible from the passage (e.g., the inlet of the guiding channel). The longer the guiding channel, the more the venting products can cool down by transferring thermal energy to the channel wall and the cooling plate as explained above. Therefore, the passage may be arranged near one end of the cooling plate and the system exit may be arranged in the channel wall near an opposite end of the cooling plate. The system exit may be arranged in the channel wall near a side wall member of the battery housing. For example, the passage may be arranged near a first sidewall member and the system exit may be arranged near a second sidewall member opposite the first sidewall member.

According to another embodiment of the present disclosure, a vehicle including a battery module as defined above is provided. The battery system may be integrated into an underbody construction of the vehicle, which allows the battery system to have a substantially flat shape. In case of a thermal runaway, venting products exiting the battery system towards an environment of the vehicle are cooled down substantially. Thereby, any danger to bystanders is reduced or prevented.

Further aspects and features of the present disclosure can be learned from the dependent claims or the following description.

BRIEF DESCRIPTION OF THE DRAWINGS

Aspects and features of the present disclosure will become apparent to those of ordinary skill in the art by describing, in detail, embodiments thereof with reference to the attached drawing in which:

The FIGURE is a schematic side view of a battery system according to an embodiment.

DETAILED DESCRIPTION

Reference will now be made in detail to embodiments, an example of which is illustrated in the accompanying drawing. Aspects and features of the embodiments, and implementation methods thereof, will be described with reference to the accompanying drawing. In the drawing, like reference numerals denote like elements, and redundant descriptions may be omitted. The present disclosure, however, may be embodied in various different forms and should not be construed as being limited to only the illustrated embodiment. Rather, these embodiments are provided as examples so that this disclosure will be thorough and complete and will fully convey the aspects and features of the present disclosure to those skilled in the art.

Accordingly, processes, elements, and techniques that are not considered necessary to those having ordinary skill in the art for a complete understanding of the aspects and features of the present disclosure may not be described. In the drawing, the relative sizes of elements, layers, and regions may be exaggerated for clarity. For example, in the drawings, the size or thickness of each element may be arbitrarily shown for illustrative purposes, and thus the embodiments of the present disclosure should not be construed as being limited thereto.

As used herein, the term "and/or" includes any and all combinations of one or more of the associated listed items. Further, the use of "may" when describing embodiments of the present disclosure refers to "one or more embodiments of the present disclosure." In the following description of embodiments of the present disclosure, the terms of a singular form may include plural forms unless the context clearly indicates otherwise.

It will be understood that although the terms "first" and "second" are used to describe various elements, these elements should not be limited by these terms. These terms are only used to distinguish one element from another element. For example, a first element may be named a second element and, similarly, a second element may be named a first element, without departing from the scope of the present disclosure. Expressions such as "at least one of," when preceding a list of elements, modify the entire list of elements and do not modify the individual elements of the list.

As used herein, the term "substantially," "about," and similar terms are used as terms of approximation and not as terms of degree and are intended to account for the inherent deviations in measured or calculated values that would be recognized by those of ordinary skill in the art. Further, if the term "substantially" is used in combination with a feature that could be expressed using a numeric value, the term "substantially" denotes a range of +/−5% of the value centered on the value.

It will be further understood that the terms "include," "comprise," "including," or "comprising" specify a property, a region, a fixed number, a step, a process, an element, a component, and a combination thereof but do not exclude other properties, regions, fixed numbers, steps, processes, elements, components, and combinations thereof.

It will also be understood that when an element is referred to as being "above" or "on" another element, it can be directly on the other element, or intervening elements may also be present.

Herein, the terms "top" and "bottom" are defined according to the z-axis. For example, the top cover is positioned at the upper part of the z-axis, whereas the bottom cover is positioned at the lower part thereof.

Unless otherwise defined, all terms (including technical and scientific terms) used herein have the same meaning as commonly understood by one of ordinary skill in the art to which the present disclosure belongs. It will be further understood that terms, such as those defined in commonly used dictionaries, should be interpreted as having a meaning that is consistent with their meaning in the context of the relevant art and/or the present specification and should not be interpreted in an idealized or overly formal sense unless expressly so defined herein.

The FIGURE shows an embodiment of a battery system 10 for an electric vehicle according to the present disclosure. The battery system 10 includes a plurality of battery cells 12 and a battery housing 20. For better readability, only some of the battery cells 12 are marked with reference numerals. The battery cells 12 are arranged in a row and may form one or more battery modules. The battery cells 12 have a venting side 14 at a first end, which may be regarded as an upper side, and a cooling side (or cooled side) 16 opposite the venting side 14 at a second end. The cooling side 16 may be regarded as a lower side. The venting side 14 has venting exits (e.g., vents or vent openings) through which venting products, such as venting gas and/or particles, may exit the battery cells 12 during, for example, a thermal runaway. The cooling side 16 is arranged on top of (e.g., faces) a cooling plate 18 and is in thermal connection with the cooling plate 18. The cooling side 16 of the battery cells 12 face a first side 18a of the cooling plate 18.

The battery housing 20 includes a top cover 24, a bottom cover 26 opposite the top cover 24, and first and second sidewall members (e.g., sidewalls) 28, 30 connecting (e.g., extending between) the bottom cover 26 and the top cover 24 of the battery housing 20. The battery housing 20, with its top cover 24, bottom cover 26, and first and second sidewall members 28, 30, forms an enclosure in which the battery cells 12 are arranged together with the cooling plate 18. Thus, the battery housing 20, together with the cooling plate 18, encloses the plurality of battery cells 12 in a cell chamber 22, which, in the illustrated embodiment, may be regarded as an upper chamber.

The battery system 10 further includes a guiding channel 32, which is formed between a second side 18b of the cooling plate 18 arranged opposite the first side 18a and a channel wall 34 facing the second side 18b of the cooling plate 18. In the illustrated embodiment, the guiding channel 32 may be regarded as a lower chamber. The channel wall 34 is part of the bottom cover 26, which in the illustrated embodiment forms an underbody of the battery housing. For example, the battery cells 12 are arranged on top of the cooling plate 18 (e.g., on the first side 18a of the cooling plate 18) while the guiding channel 32 is arranged below the cooling plate 18. The cooling plate 18, at its left side end, is connected to the second sidewall member 30 and extends from the second sidewall member 30 towards the first sidewall member 28, and a passage (e.g., a space or gap) 36 is arranged between the right side end of the cooling plate 18 and the first sidewall member 28 facing the right side end of the cooling plate 18. The passage 36 connects (e.g., fluidly connects or allows fluid communication between) the cell chamber 22 and the guiding channel 32.

The cooling plate 18 divides the enclosure formed by the battery housing 20 into two chambers, the cell chamber 22 above the cooling plate 18 as an upper chamber where the battery cells 12 are arranged and the guiding channel 32 as a lower chamber below the cooling plate 18. The passage 36 is the only connection (e.g., fluid connection) between the cell chamber 22 and the guiding channel 32 that allows for venting products leaving the cells 12 to pass into the guiding channel 32. Due to this arrangement, the venting products, which leave the battery cells 12 at the venting side 14 thereof into the cell chamber 22 towards the top cover 24, are directed along a venting path V from the cell chamber 22 through the passage 36 into the guiding channel 32, and through the guiding channel 32 to an environment 40 of the battery system 10 via a system exit 38.

The top cover 24, the bottom cover 26, and the first and second sidewall members 28, 30 are, in the illustrated embodiment, double profile structures including inner walls facing an inside of the battery system and outer walls opposite the inner walls facing an outside of the battery system. Such profile structures provide structural stiffness to the battery housing. The channel wall 34, for example, can be considered the inner wall of the bottom cover 26. The second sidewall member 30 has an inner wall 30a facing the cell chamber 22 and the guiding channel 32 and an opposite outer wall 30b, and an exit channel 39 is arranged inside the second sidewall member 30 delimited by the inner wall 30a and the outer wall 30b. An opening (e.g., a hole) 300a is arranged at a lower portion of the inner wall 30a. Thus, the guiding channel 32 and the exit channel 39 are connected each other via the opening 300a. The system exit 38 is arranged in the outer wall 30b of the second sidewall member 30. The system exit 38 may include a venting element, such as a venting valve. However, the top cover 24, the bottom cover 26, and the first and second sidewall members 28, 30 are not limited to double profile structures. Instead, one or more and even all of these elements may be sheet metals or extrusion profiles. Generally, the top cover 24, the bottom cover 26, and the first and second sidewall members 28, 30 may be, in any combination, selected from the group of: double profile structures, extrusion profiles, and sheet metal. For example, the top cover 24 and the bottom cover 26 may be sheet metal while the first and second sidewall members 28, 30 are double profile structures or extrusion profiles.

In a conventional battery system design, the system exit would be arranged in, for example, the first sidewall member 28 so that venting products, such as venting gas, exiting one or more battery cells 12 during a thermal runaway would exit the battery system 10 via the dotted line D shown in the FIGURE. These venting products would exit the battery system at that point at a potentially very high temperature, especially when multiple cells 12 vent at the same time or within a short time span. The hot venting products may pose a danger to bystanders as they may cause burns. Also, the venting products may ignite due to the high temperature.

With the battery system design according to embodiments of the present disclosure, the venting products exiting the battery cells 12 during a thermal runaway do not leave the battery system 10 via such a short route but rather on a detour. As explained above, the venting products are directed along the venting path V from the cell chamber 22 through the passage 36 into the guiding channel 32 and through the guiding channel 32 to the environment 40 of the battery system 10 and via the system exit 38 at the second sidewall member 30. For example, the venting products flow from the cell chamber 22 into the guiding channel 32 via the passage 36 towards an underbody of the battery system 10 below the cooling plate 18. The venting products then flow along the guiding channel 32 between the cooling plate 18 and the bottom cover 26 and its channel wall 34 as an underbody, or underbody protection, into the exit channel 39 in a hollow profile of the second sidewall member 30 and through the system exit 38 to the outside of the battery system 10.

Compared to conventional battery systems, the venting path the venting products take from the battery cells to the environment of the battery system according to embodiments of the present disclosure is longer so that the venting products may pass more thermal energy to the inside parts of the battery system. For example, a large amount of thermal energy is transferred from the venting products to the cooling plate 18 and the channel wall 34, which delimit the guiding channel. This venting geometry (or venting arrangement) leads to a significant cool-down of the venting products before exiting the battery system 10 into the environment 40 so that the danger of burns and combustion of the gas in the environment 40 (e.g., when it comes into contact with oxygen) is reduced or minimized. For example, the venting products exiting the battery system 10 according to embodiments of the present disclosure into the environment 40 are at lower temperature than in conventional battery systems.

The venting path of the battery system 10 as shown in the FIGURE is relatively long as the guiding channel 32 extends all the way from the first sidewall member 28 to the second sidewall member 30, in other words, from one end of the cooling plate 18 to the opposite end of the cooling plate 18 and along the entire length of cooling plate 18. Thus, the venting products may pass a large amount of thermal energy to the cooling plate 18 and/or the channel wall 34, resulting in a significant cool down of the venting products. The system exit 38, however, may be arranged at another place, such as in the bottom cover 26. The venting products would then leave the battery system 10 downwardly through the underbody. Nevertheless, even in this other embodiment, the venting products cross a significant portion of the volume between the channel wall 34 of the bottom cover 26 and the cooling plate 18 such that its temperature is significantly reduced.

SOME REFERENCE SIGNS 10 battery system
12 battery cells
14 venting side of the battery cells
16 cooling side of the battery cells
18 cooling plate
18a first side of cooling plate
18b second side of cooling plate
20 battery housing
22 cell chamber
24 top cover
26 bottom cover
28 first sidewall member
30 second sidewall member
30a inner wall of second sidewall member
30b outer wall of second sidewall member
32 guiding channel
34 channel wall
36 passage
38 system exit
39 exit channel
D dotted line
V venting path

What is claimed is:

1. A battery system comprising:
   a plurality of battery cells, each of the battery cells having a venting side comprising a venting exit configured to allow venting products to exit the battery cells during a thermal runaway and a cooling side opposite the venting side;
   a cooling plate, the cooling side of the battery cells being in thermal connection with a first side of the cooling plate; and
   a battery housing enclosing the battery cells in a cell chamber,
   wherein a guiding channel is formed between a second side of the cooling plate opposite the first side and a channel wall of the battery housing facing the second side of the cooling plate,
   wherein a passage fluidly connects the cell chamber and the guiding channel such that, when the venting products are emitted by the battery cells from the venting side into the cell chamber, the venting products are directed along a venting path from the cell chamber through the passage into the guiding channel and through the guiding channel to an environment of the battery system via a system exit.

2. The battery system of claim 1, wherein the passage is arranged at one end of the cooling plate and the system exit is arranged at an opposite end of the cooling plate such that the guiding channel extends from the one end of the cooling plate to the opposite end of the cooling plate.

3. The battery system of claim 2, wherein the system exit is arranged in a sidewall member of the battery housing.

4. The battery system of claim 2, wherein the battery housing comprises a first sidewall member and a second sidewall member opposite the first sidewall member, and
   wherein the passage is adjacent the first sidewall member, and the system exit is in the second sidewall member.

5. The battery system of claim 2, wherein the system exit is arranged in the channel wall.

6. The battery system of claim 2, wherein the battery housing comprises a top cover facing the venting side of the battery cells, and
   wherein the cell chamber is defined by the top cover and the first side of the cooling plate.

7. The battery system of claim 6, wherein the battery housing further comprises a bottom cover opposite the top cover, and
   wherein the bottom cover forms the channel wall.

8. The battery system of claim 7, wherein the bottom cover is a bottom of the battery housing.

9. An electric vehicle including the battery system according to claim 1.

\* \* \* \* \*